July 26, 1932.     E. R. KNOTT     1,868,578
MACHINE FOR POPPING CORN
Filed Jan. 26, 1931     4 Sheets-Sheet 2
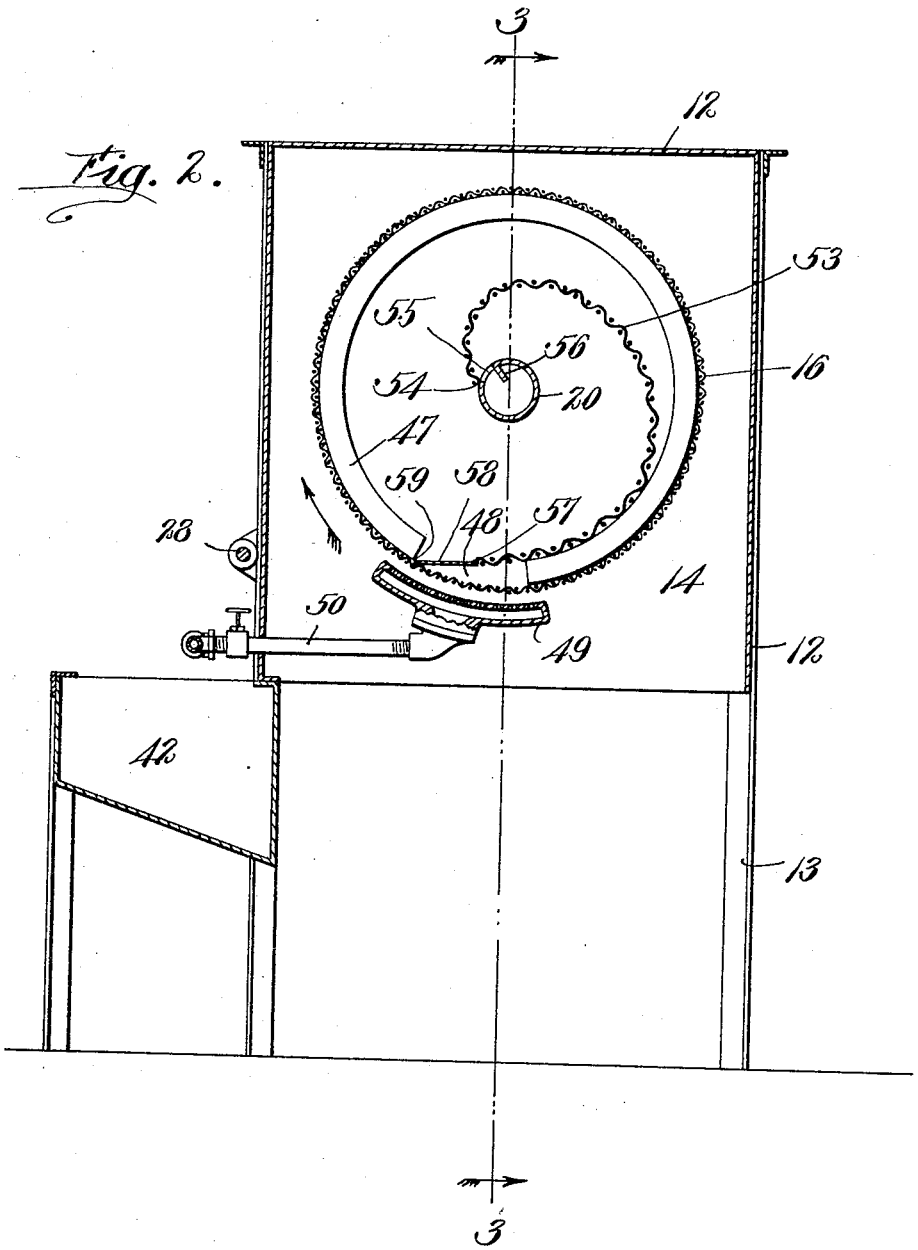
Inventor
Eustace R. Knott
by A. W. Harrison
Atty.

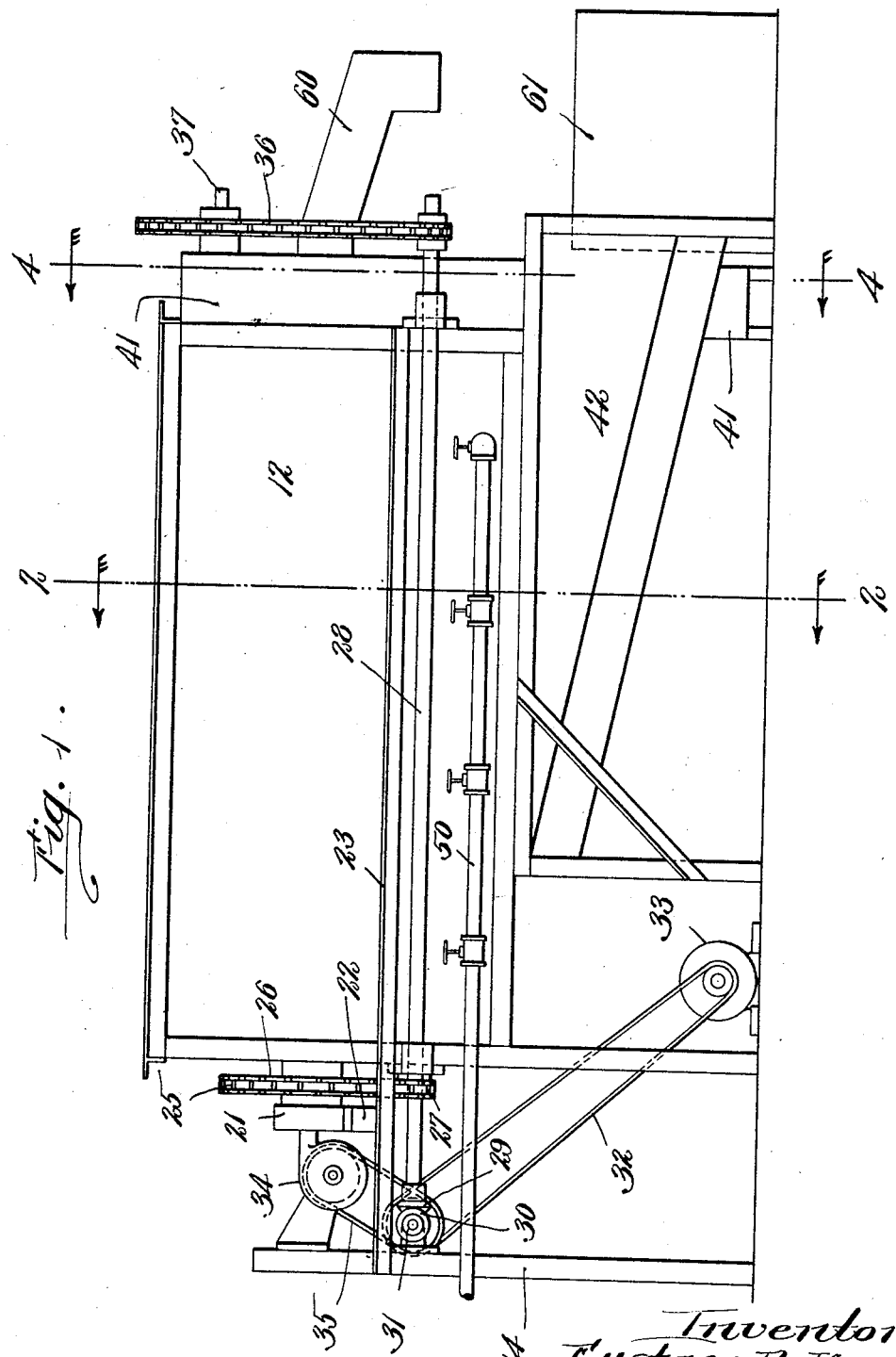

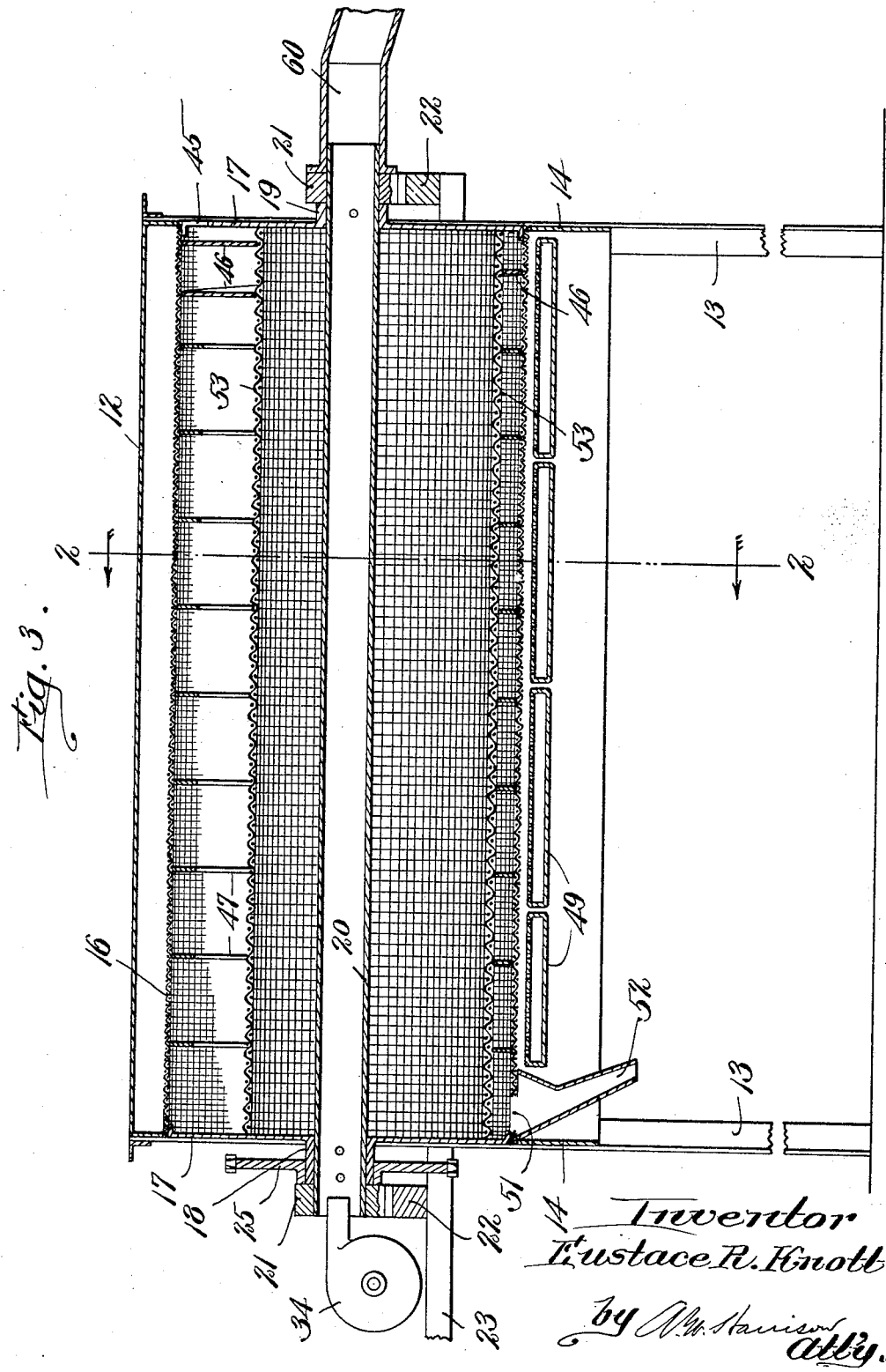

July 26, 1932. E. R. KNOTT 1,868,578
MACHINE FOR POPPING CORN
Filed Jan. 26, 1931  4 Sheets-Sheet 4
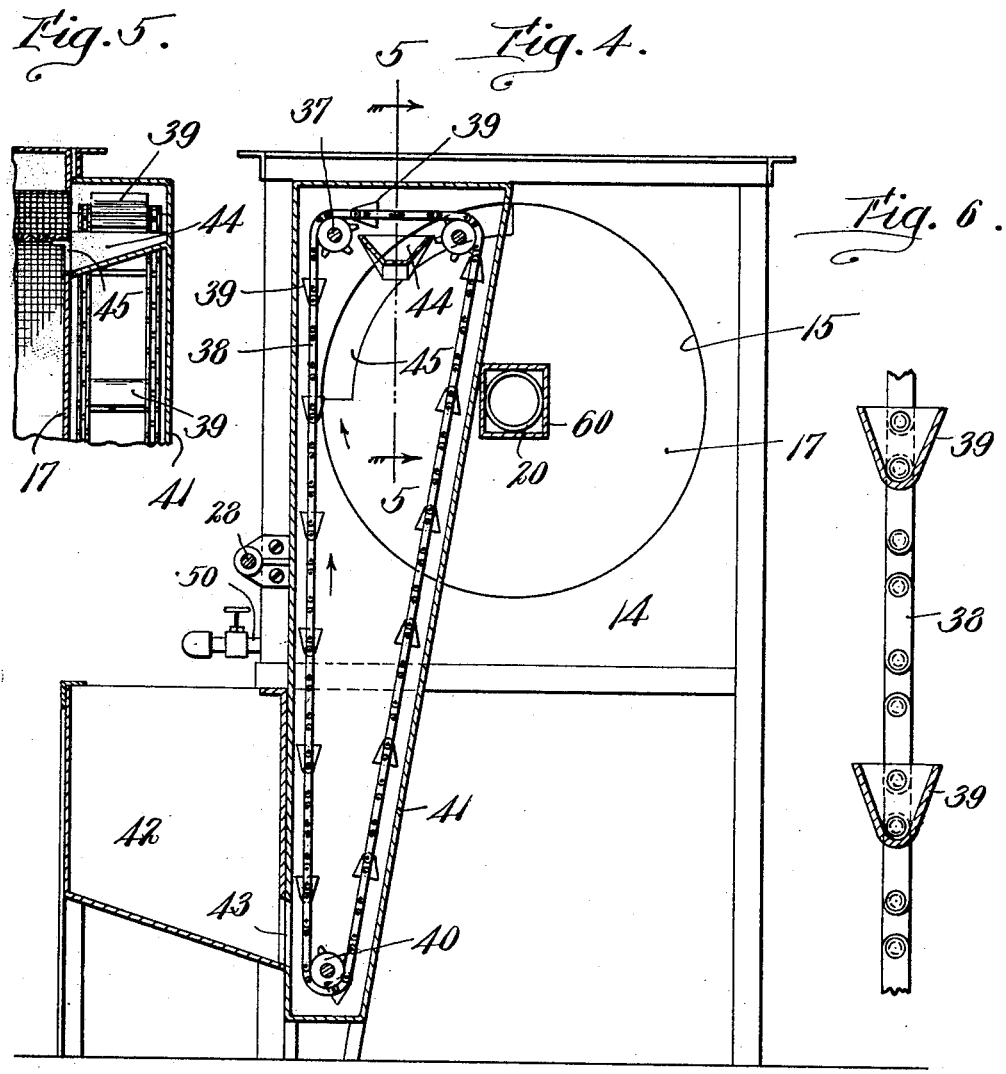
Inventor:
Eustace R. Knott
by
Atty.

Patented July 26, 1932

1,868,578

UNITED STATES PATENT OFFICE

EUSTACE R. KNOTT, OF SHARON, MASSACHUSETTS

MACHINE FOR POPPING CORN

Application filed January 26, 1931. Serial No. 511,189.

This invention relates to machines for popping corn, and has particular reference to that type of machine which is automatically supplied with a succession of charges of unpopped corn, and subjects the corn to heat, and automatically separates the popped corn from the un-popped corn and delivers the two grades at separate points.

One of the objects of my invention is to provide a corn popping machine which is not only simple in construction and operation, but also may be easily cleaned.

Another object is to provide a corn popping machine which produces a greater percentage of popped corn than heretofore.

Another object is to provide a corn popping machine which operates at a higher speed of production than heretofore.

And other objects are to provide corn popping machines in which clogging will not occur, and which produce popped corn of large size, and during a minimum of time, and with a minimum amount of waste.

I attain practically all of the above-mentioned objects by employing a continuous current of air to remove the popped corn from the machine, and my invention consists in the construction and combination of parts substantially as hereinafter described and claimed.

Of the accompanying drawings:—

Figure 1 is a side elevation of one of my improved machines.

Figure 2 represents a section on line 2—2 of Figures 1 and 3.

Figure 3 represents a section on line 3—3 of Figure 2.

Figure 4 represents a section on line 4—4 of Figure 1.

Figure 5 represents a section on line 5—5 of Figure 4.

Figure 6 is a detail elevation of a portion of the chain of buckets, on a larger scale.

Similar reference characters designate similar parts or features in all of the views.

An outer casing 12 supported by suitable legs 13, has end walls 14, the latter having circular openings 15 which are occupied by the head 17 of a rotary foraminous or wire mesh cylinder 16, said heads 17 having hub members 18, 19, which are suitably connected to the opposite ends of an axial tube 20 the projecting ends of which are mounted in bearings 21 supported by a suitable frame which is illustrated as comprising cross bars 22, longitudinal bars 23, and one or more posts 24.

Secured to the hub 18 is a sprocket 25 (Figs. 1 and 3) which is connected by a chain 26 with a sprocket 27 of the shaft 28, the latter being geared by bevel pinions 29, 30, to the shaft 31 which is connected by a belt 32 with the shaft of a motor 33.

A blower 34 is driven from the shaft 31 by a belt or chain 35. The nozzle of said blower delivers a strong current of air into and through the tube 20 which latter constitutes an elongated chamber for receiving the corn as it is popped, as hereinafter described.

At the other end of the shaft 28 is a sprocket which is connected by a chain 36 with a sprocket of a short shaft 37 (Figs. 1 and 4). Engaging the said sprocket of the shaft 37, and another sprocket at one side thereof, is a chain 38 carrying buckets 39, the chain and buckets also passing around a lower idle sprocket 40. All three of said sprockets, and the chain and its buckets, are enclosed in a chamber 41 outside of the main casing 12.

A hopper 42 to receive the corn to be popped, communicates by means of an opening 43 with the lower portion of the chamber 41.

In operation, the buckets 39 successively lift small quantities of the corn and discharge it into an inclined chute 44 the delivery end of which is in a position so that each time the curved elongated opening or throat 45 in the head 17 passes said chute, the corn that was deposited in the chute by a passing bucket 39 will pass into the rotating wire-mesh cylinder 16. The spacing of the buckets of the chain, and the speed of travel of said chain and the speed of rotation of the cylinder are so relatively timed as to cause each bucket to deliver un-popped corn into the chute so that it can pass from the chute while the opening or throat 45 is passing the chute.

Just inside the end or head 17 which has the curved opening 45, is a spiral strip 46 (Fig. 3) carried by the rotating cylinder 16, and at separated points toward the other end of the cylinder are incomplete annular strips 47. By incomplete, I mean that there is a space 48 (Fig. 2) between the two ends of each strip 47.

Below the cylinder 16, I provide a plurality of independent gas burners 49 (Figs. 2 and 3) each having an independent controllable gas supply by a system of piping 50. I have found in practice that by employing separate heaters of which the first applies the highest temperature and the other successively lower, I am able to produce corn which is popped to larger sizes than when the same degree of heat is applied throughout. It is to be understood at this point that during the operation of the machine, the corn which is being heated is working along the cylinder from the right-hand end (Figs. 1 and 3) toward the left.

During the operation, as presently described, all of the corn in the cylinder, whether popped or not, is gradually worked along by the incoming supply and the spiral 46, and the un-popped corn eventually escapes through the opening 51 (Fig. 3) and a spout 52 into any suitable receptacle.

To lift the popped corn and cause it to get into the elongated axial chamber 20, I provide the foraminous screen 53 which is of coarser mesh than the cylinder 16 so that if any un-popped corn should be lifted, it will fall back through the meshes of said screen 53. Said screen extends from one end wall 17 to the other end wall (Fig. 3) and at its inner edge 54 (Fig. 2) is connected to the tube 20 adjacent to the slot 55 in said tube, said slot 55 being of substantially the same length as the tube. An edge 56 of the tube along one side of the slot is bent inwardly. The outer edge 57 of the lifting screen has a plate 58 secured to it, the opposite edge 59 of said plate being secured to the mesh cylinder 16.

The end of the tube 20 opposite the blower extends into a delivery spout 60 (Fig. 3) which is secured to the adjacent bearing 21 and is non-rotary, said spout being somewhat angular in form so that popped-corn blown through the tube 20 will be directed into a suitable receiver 61 (Fig. 1).

A résumé of the operation of the machine as a whole will now be given:—A large quantity of corn to be popped having been deposited in the hopper 42, a smaller quantity of it is constantly maintained in the bottom of the chamber 41, and the chain buckets successively lift practically measured quantities of it and each bucket empties its corn into the chute 44 in time for that corn to pass through the curved throat 45 into the revolving cylinder 16. In other words, the cylinder receives one bucketful of corn during each of its rotations.

Due to the spiral strip 46, and the successive deposits of corn in the cylinder, the corn gradually moves toward the other end of the cylinder and all of it which is capable of being popped by the heat from the burners is lifted by the inner screen 53 and eventually passes into the tube 20 through its slot 55. Of course, some un-popped corn is also lifted, but owing to the larger meshes of the lifting screen, it escapes back into the outer space in the cylinder and is either finally popped or escapes through the opening 51.

The popped corn which passes into the tube 20 is immediately forced by the current of air from the blower out through the spout 60. If anything occurs to cause a stoppage of the flow of popped kernels along the tube, the inwardly extending ledge 56 (Fig. 2) tends to stir up the kernels in the tube and direct them along to the escape end.

In practice, to enable the machine to be readily cleaned, one of the ends or heads 17 is removably secured in its position, by devices not necessary to illustrate in detail since such devices may be of any well known type.

Having now described my invention, I claim:—

1. A corn-popping machine having a straight slotted tube freely open at both ends, and a rotary foraminous cylinder surrounding the tube, a blower for forcing air through the tube, means for heating corn in said cylinder, and means for causing popped corn to pass from the cylinder through the slot of and into said tube, said tube having no openings other than said slot and open ends.

2. A corn-popping machine having a longitudinally slotted tube freely open at both ends and being otherwise imperforate, a rotary foraminous cylinder surrounding the tube, a blower for forcing air through the tube, means for heating corn in the cylinder, and an inner foraminous screen connecting the said cylinder with an edge of the slot in the tube to cause popped corn to pass from the cylinder into said tube.

3. In a corn-popping machine, the combination with a rotary cylinder and means for heating corn therein, said cylinder including an end head having a curved slot, of an endless series of buckets, a corn receptable from which the buckets take un-popped corn, a chute for receiving corn from the buckets and delivering said corn through said slot into the cylinder, and means for driving the rotary cylinder and the said series of buckets in timed relationship to cause each bucket to deliver its corn to and through said chute while said curved slot is passing the chute.

4. A corn-popping machine having a rotary foraminous cylinder, means for automatically delivering measured quantities of un-popped corn thereinto, means for heating the corn in the cylinder, an unobstructed substantially imperforate tube extending lengthwise of the cylinder, means for causing popped corn to enter said tube, and a blower for ejecting said corn from the tube.

In testimony whereof I have affixed my signature.

EUSTACE R. KNOTT.